(12) United States Patent
Hayes

(10) Patent No.: US 8,225,695 B2
(45) Date of Patent: Jul. 24, 2012

(54) ARRANGEMENT FOR INHIBITING RANGE SHIFTING IN A TRANSMISSION

(75) Inventor: Timothy G. Hayes, Kernersville, NC (US)

(73) Assignee: Mack Trucks, Inc., Greensboro, NC (US)

( * ) Notice: Subject to any disclaimer, the term of this patent is extended or adjusted under 35 U.S.C. 154(b) by 394 days.

(21) Appl. No.: 12/672,529

(22) PCT Filed: Sep. 14, 2007

(86) PCT No.: PCT/US2007/078557
§ 371 (c)(1),
(2), (4) Date: Feb. 8, 2010

(87) PCT Pub. No.: WO2009/035461
PCT Pub. Date: Mar. 19, 2009

(65) Prior Publication Data
US 2011/0174590 A1    Jul. 21, 2011

(51) Int. Cl.
*F16H 3/22* (2006.01)
(52) U.S. Cl. ................. 74/745; 74/342; 74/343
(58) Field of Classification Search .............. 74/335, 74/336 R, 340, 342, 343, 745
See application file for complete search history.

(56) References Cited

U.S. PATENT DOCUMENTS

| | | |
|---|---|---|
| 2,637,221 A | 5/1953 | Backus et al. |
| 2,637,222 A | 5/1953 | Backus |
| 3,031,898 A | 5/1962 | Eaton |
| 3,105,395 A | 10/1963 | Perkins |
| 3,987,686 A | 10/1976 | Paplaski |
| 4,181,041 A | 1/1980 | Frost |
| 4,269,079 A | 5/1981 | Fredell et al. |
| 4,296,642 A | 10/1981 | Schetter |
| 4,353,290 A | 10/1982 | Hoffman et al. |
| 4,380,278 A | 4/1983 | Lasken |
| 4,732,247 A | 3/1988 | Frost |

(Continued)

FOREIGN PATENT DOCUMENTS
WO        0155620 A1    8/2001

OTHER PUBLICATIONS

International Search Report for corresponding International Application PCT/US2007/078557, Aug. 22, 2008.

Primary Examiner — Ha D. Ho
(74) Attorney, Agent, or Firm — WRB-IP LLP

(57) ABSTRACT

An arrangement for inhibiting axial movement of a range clutch in a transmission includes a driver adapted to move the range clutch axially on an output shaft between a high range position and a low range position, a sensor arrangement adapted to sense at least one of reverse rotational direction and potential reverse rotational direction of at least one of a main shaft and the output shaft and to generate an inhibit range shift signal upon sensing at least one of reverse rotational direction and potential reverse rotational direction, and a controller adapted to inhibit operation of the driver upon receipt of the inhibit range shift signal from the sensor arrangement. A transmission and a vehicle including such an arrangement are also disclosed. A method for inhibiting axial movement of a range clutch in a transmission, and a method of retrofitting a transmission with an arrangement for inhibiting axial movement of a range clutch are also disclosed.

20 Claims, 5 Drawing Sheets

U.S. PATENT DOCUMENTS

| | | |
|---|---|---|
| 4,735,105 A | 4/1988 | Kumazawa |
| 4,754,665 A | 7/1988 | Vandervoort |
| 4,821,591 A | 4/1989 | Adler |
| 4,944,197 A | 7/1990 | Stine et al. |
| 5,135,087 A | 8/1992 | Frost |
| 5,370,013 A | 12/1994 | Reynolds et al. |
| 5,471,893 A | 12/1995 | Newbigging |
| 5,737,969 A | 4/1998 | Brown et al. |
| 5,913,936 A | 6/1999 | Kruse et al. |
| 6,571,927 B2 | 6/2003 | Rose et al. |
| 6,659,900 B2 | 12/2003 | Nagasaka et al. |
| 7,204,166 B2 | 4/2007 | Gochenour |
| 2001/0025535 A1* | 10/2001 | Kamiya .......................... 74/335 |
| 2001/0025537 A1 | 10/2001 | Cox |
| 2003/0047016 A1* | 3/2003 | Kliemannel ................... 74/335 |
| 2005/0066755 A1 | 3/2005 | Hughes et al. |
| 2006/0116234 A1 | 6/2006 | Alfredsson |
| 2007/0214906 A1* | 9/2007 | Fahland et al. ................. 74/340 |

\* cited by examiner

ARRANGEMENT FOR INHIBITING RANGE SHIFTING IN A TRANSMISSION

BACKGROUND AND SUMMARY

The present invention relates to a transmission and, more particularly, to a multi-gear, multi-range transmission with an arrangement for preventing a range shift when the transmission is in reverse gear.

In certain vehicle transmissions, particularly manual vehicle transmissions for heavy vehicles, a first main section is provided and includes a plurality of gears to provide a plurality of different speed ratios. A second, auxiliary section is often provided that permits input torque from the first section to be modified from, for example, a first range to a second range to provide an additional set of speed ratios. Thus, a transmission having a main transmission section adapted to be shifted from neutral into, for example, one of five forward gear positions and one reverse gear position can have ten forward speed ratios and two reverse speed ratios by shifting from a low range to a high range.

The auxiliary or range section of the transmission typically has a shift collar functioning together with a synchronizer arrangement. The shift collar is movable between a high range position in which the shift collar connects the input shaft from the first main section directly to an output shaft and a low range position in which the shift collar connects the input shaft to the output shaft through a gear reduction arrangement. The shift collar arrangement can have internal teeth that constantly engage external teeth on the output shaft. If the shift collar arrangement is moved axially along the output shaft out of a neutral position to the high range position or the low range position, the internal teeth on the shift collar can also engage external teeth on either the input shaft or the gear reduction arrangement.

The synchronizer arrangement is movable by the shift collar and is typically provided to assist in shifting from low range to high range, or vice versa. Synchronizing clutch assemblies of this general type are available from Mack Trucks, Inc., identified as Part No. 320 KB3147 or 320KB3150. U.S. Pat. No. 6,571,927 also discloses a synchronizing arrangement of such a general type and is incorporated by reference.

In an illustrative synchronizing arrangement of this type, first and second synchronizer cones with external friction surfaces are spaced by pins that extend through apertures in a shift collar disposed between the cones. The pins include a first set of pins with tapered surfaces tapering from a larger diameter to a smaller diameter in the direction from the first synchronizer cone to the second synchronizer cone and a second set of pins with tapered surfaces tapering from a larger diameter to a smaller diameter in the direction from the second synchronizer cone to the first synchronizer cone. Springs are disposed in recesses in the shift collar and bias the surfaces of the apertures of the shift collar against the surfaces of the pins when the shift collar and the synchronizer cones are rotated in a direction corresponding to forward.

When shifting ranges, the external friction surfaces of the first or second synchronizer cones first contact an internal friction surface on mating synchronizing cones associated with a high range or a low range position of the synchronizing arrangement. As the synchronizing cones are brought closer together and approach the same rotational speeds, at least some of the springs in the shift collar are initially in contact with the smaller diameter portions of the pins so that there is a limited amount of play between the synchronizing cones and the shift collar. When the internal teeth on the shift collar are about to engage the external teeth on the input shaft or the gear reduction arrangement, the springs contact the tapered surfaces of the set of pins associated with high range or low range, respectively, simultaneously tending to resist further movement toward the high range or low range positions and reducing the amount of play possible while the mating synchronizing cones arrive at rotational speeds that substantially match. After the synchronizing cones arrive at matching rotational speeds, which typically occurs when the shift collar has been moved against the force of the springs so that the springs press against a large diameter portion of the set of pins, the internal teeth on the shift collar can safely engage the external teeth on the input shaft or the gear reduction arrangement without substantial risk of tooth damage due to the different speeds of the input shaft or gear reduction arrangement and the output shaft.

The springs in the shift collar are arranged to facilitate indexing of the internal teeth on the shift collar and external teeth on the input shaft or the gear reduction arrangement but are oriented so that they resist movement of the shift collar relative to the synchronizer cones only when the components are being urged in a rotational direction corresponding to a forward direction. When the main transmission is in reverse gear, the input and output shafts rotate in opposite directions than the rotational direction corresponding to a forward direction and, during shifting of range from low to high or high to low, the springs in the shift collar do not urge the surfaces of the pins against the surfaces of the apertures in the shift collar. The springs, therefore, do not facilitate bringing the synchronizing cones up to the same speeds before engagement of the teeth on the shift collar and the input shaft or the gear reduction arrangement. As a consequence, the gears can clash during a range shift in reverse, damaging the "coast sides" of the teeth, i.e., the sides of the teeth that are not in contact during rotation corresponding to a forward direction and that are in contact during rotation corresponding to a reverse direction. Damage to the coast sides of the teeth can damage the case hardening of the teeth and result in smearing of teeth on their drive sides, as well. With damage of this type, it has been observed that the transmission can jump out of range.

It is desirable to provide a transmission arrangement that can prevent a range shift in an auxiliary portion of a transmission when a main portion of the transmission is in reverse gear.

Many vehicles currently on the road do not have any arrangement to prevent an operator from making a range shift when the vehicle is in reverse gear. It is desirable to provide an inexpensive and simple retrofit arrangement for a transmission arrangement that can prevent a range shift in an auxiliary portion of a transmission when a main portion of the transmission is in reverse gear.

In accordance with an aspect of the present invention, an arrangement is provided for inhibiting axial movement of a range clutch in a transmission, the transmission comprising a main shaft and an output shaft, the range clutch being movable on the output shaft between a high range position and a low range position to modify a main shaft rotational speed to at least one different output shaft rotational speed, and a plurality of selectable gears comprising a forward gear and a reverse gear for providing different speed ratios between an input shaft and the main shaft, the main shaft rotating in a main shaft forward rotational direction and in a main shaft reverse rotational direction when coupled to the input shaft and in the forward gear and in the reverse gear, respectively, the output shaft rotating in an output shaft forward rotational direction and in an output shaft reverse rotational direction when coupled to the main shaft rotating in the main shaft forward rotational direction and in the main shaft reverse rotational direction, respectively. The arrangement comprises a driver adapted to move the range clutch axially on the output shaft between the high range position and the low range position, a sensor arrangement adapted to sense at least one of reverse rotational direction and potential reverse rotational direction of at least one of the main shaft and the output shaft and to generate an inhibit range shift signal upon sensing at least one of reverse rotational direction and potential reverse rotational direction, and a controller adapted to inhibit operation of the driver upon receipt of the inhibit range shift signal from the sensor arrangement.

In accordance with another aspect of the present invention, a method is provided for inhibiting axial movement of a range clutch in a transmission, the transmission comprising a main shaft and an output shaft, the range clutch being movable on the output shaft between a high range position and a low range position to modify a main shaft rotational speed to at least one different output shaft rotational speed, and a plurality of selectable gears comprising a forward gear and a reverse gear for providing different speed ratios between an input shaft and the main shaft, the main shaft rotating in a main shaft forward rotational direction and in a main shaft reverse rotational direction when coupled to the input shaft and in the forward gear and in the reverse gear, respectively, the output shaft rotating in an output shaft forward rotational direction and in an output shaft reverse rotational direction when coupled to the main shaft rotating in the main shaft forward rotational direction and in the main shaft reverse rotational direction, respectively. The method comprises sensing at least one of reverse rotational direction and potential reverse rotational direction of at least one of the main shaft and the output shaft and inhibiting movement of the range clutch axially on the output shaft between the high range position and the low range position.

In accordance with another aspect of the present invention, a method of retrofitting a transmission to inhibit axial movement of a range clutch in the transmission is provided, the transmission comprising a main shaft and an output shaft, the range clutch being movable on the output shaft between a high range position and a low range position to modify a main shaft rotational speed to at least one different output shaft rotational speed, and a plurality of selectable gears comprising a forward gear and a reverse gear for providing different speed ratios between an input shaft and the main shaft, the main shaft rotating in a main shaft forward rotational direction and in a main shaft reverse rotational direction when coupled to the input shaft and in the forward gear and in the reverse gear, respectively, the output shaft rotating in an output shaft forward rotational direction and in an output shaft reverse rotational direction when coupled to the main shaft rotating in the main shaft forward rotational direction and in the main shaft reverse rotational direction, respectively, wherein the range clutch is adapted to be moved to the high range position and the low range position by positioning a range shift valve in a high range shift valve position and a low range shift valve position, respectively, so that a source of hydrostatic pressure is adapted to communicate with a high range chamber and a low range chamber, respectively, of a range cylinder, the high range chamber and the low range chamber being defined by a piston movable in the range cylinder, the piston being connected to the range clutch. The method comprises providing a sensor arrangement to sense at least one of reverse rotational direction and potential reverse rotational direction of at least one of the main shaft and the output shaft and send a signal to a controller when at least one of reverse rotational direction and potential reverse rotational direction of the at least one of the main shaft and the output shaft is sensed, providing an openable and closable range shift inhibitor valve for opening and closing flow communication between the source of hydrostatic pressure and the one of the high range shift valve chamber and the low range shift valve chamber, and programming the controller to output a signal in response to the sensor arrangement signal, the controller signal controlling opening and closing of the range shift inhibitor valve.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
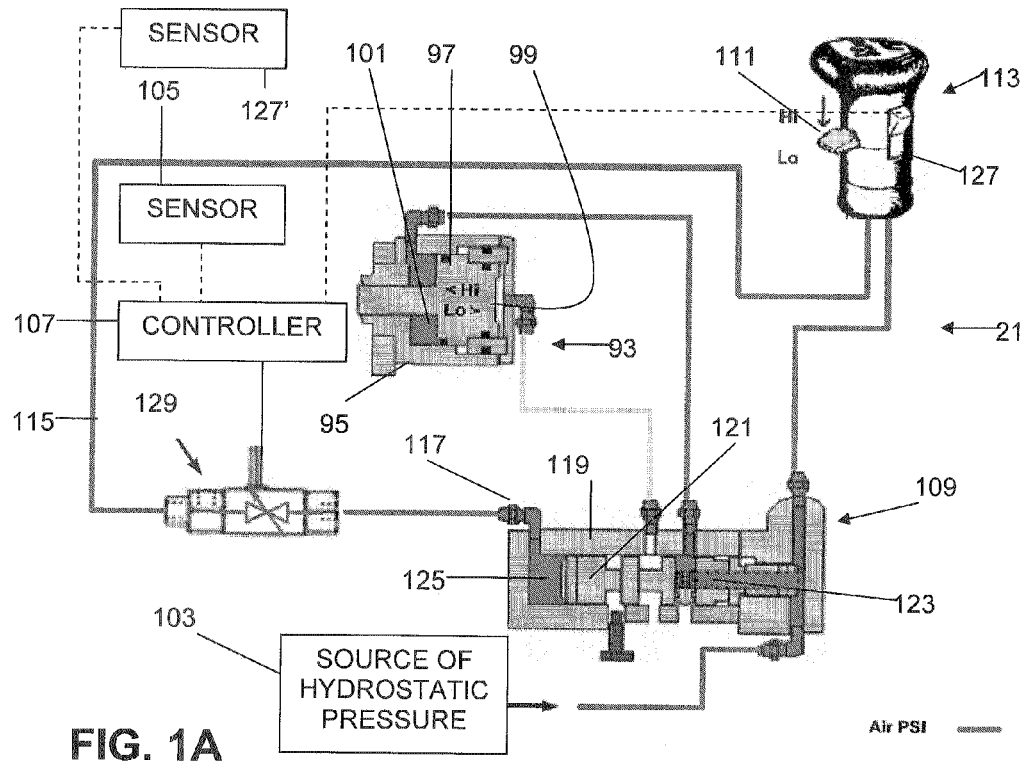
FIGS. 1A-1D schematically show an arrangement for inhibiting axial movement of a range clutch in a transmission according to an aspect of the present invention, FIG. 1A showing the arrangement in which low to high range shifting is not inhibited, FIG. 1B showing the arrangement in which low to high range shifting is inhibited, FIG. 1C showing the arrangement in which high to low range shifting is not inhibited, and FIG. 1D showing the arrangement in which high to low range shifting is inhibited.
Figure 1B:
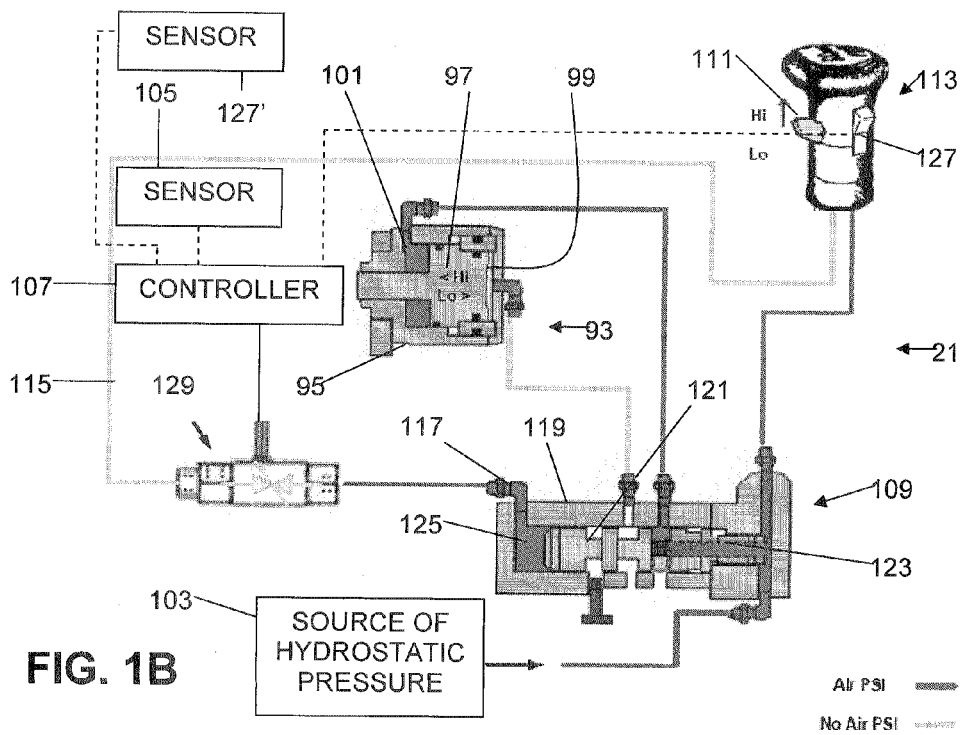
Figure 1C:
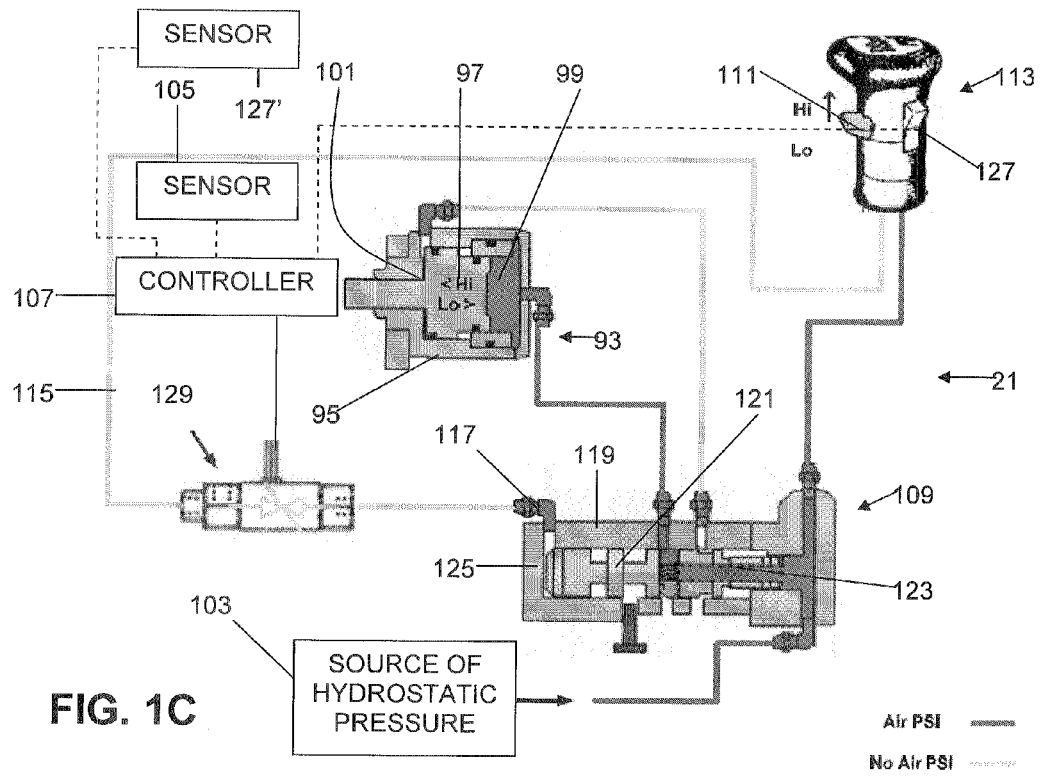
Figure 1D:
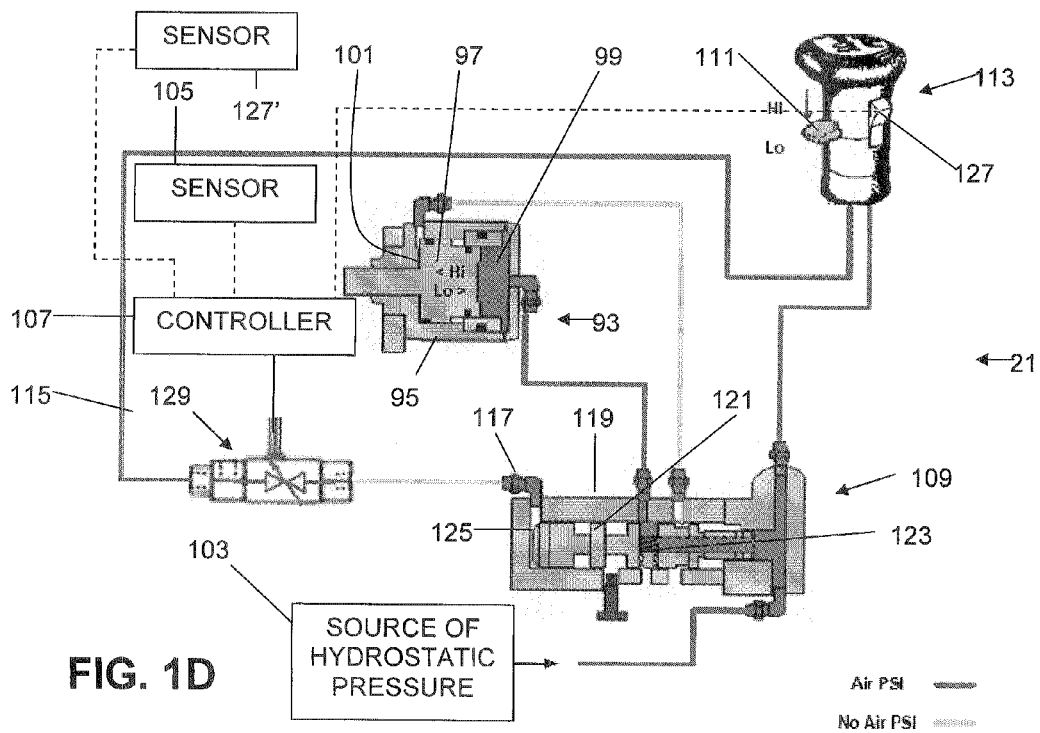
Figure 2A:
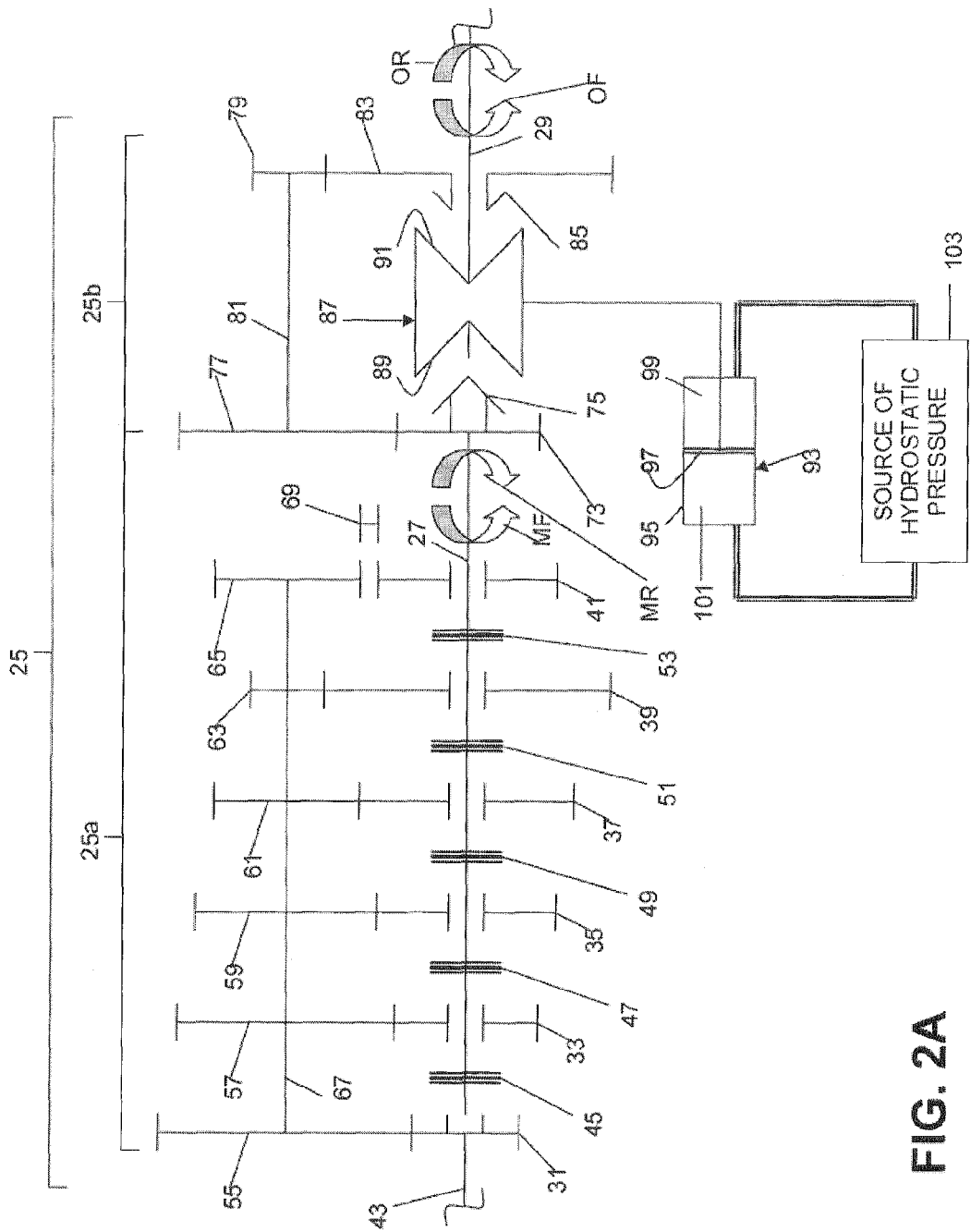
FIGS. 2A-2C schematically show a transmission according to an aspect of the present invention with a range clutch in a neutral position, a high range position, and a low range position, respectively.
Figure 2B:
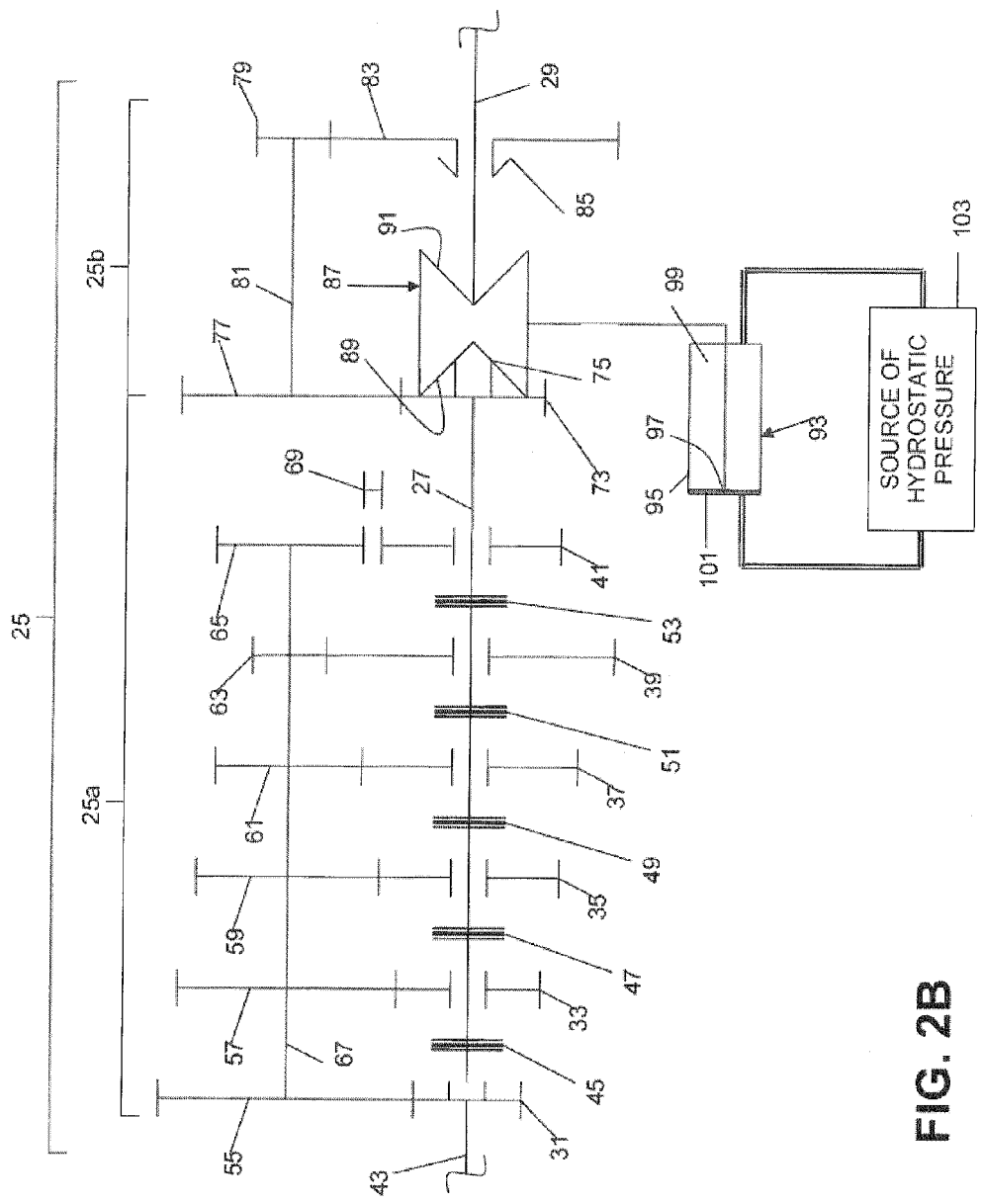
Figure 2C:
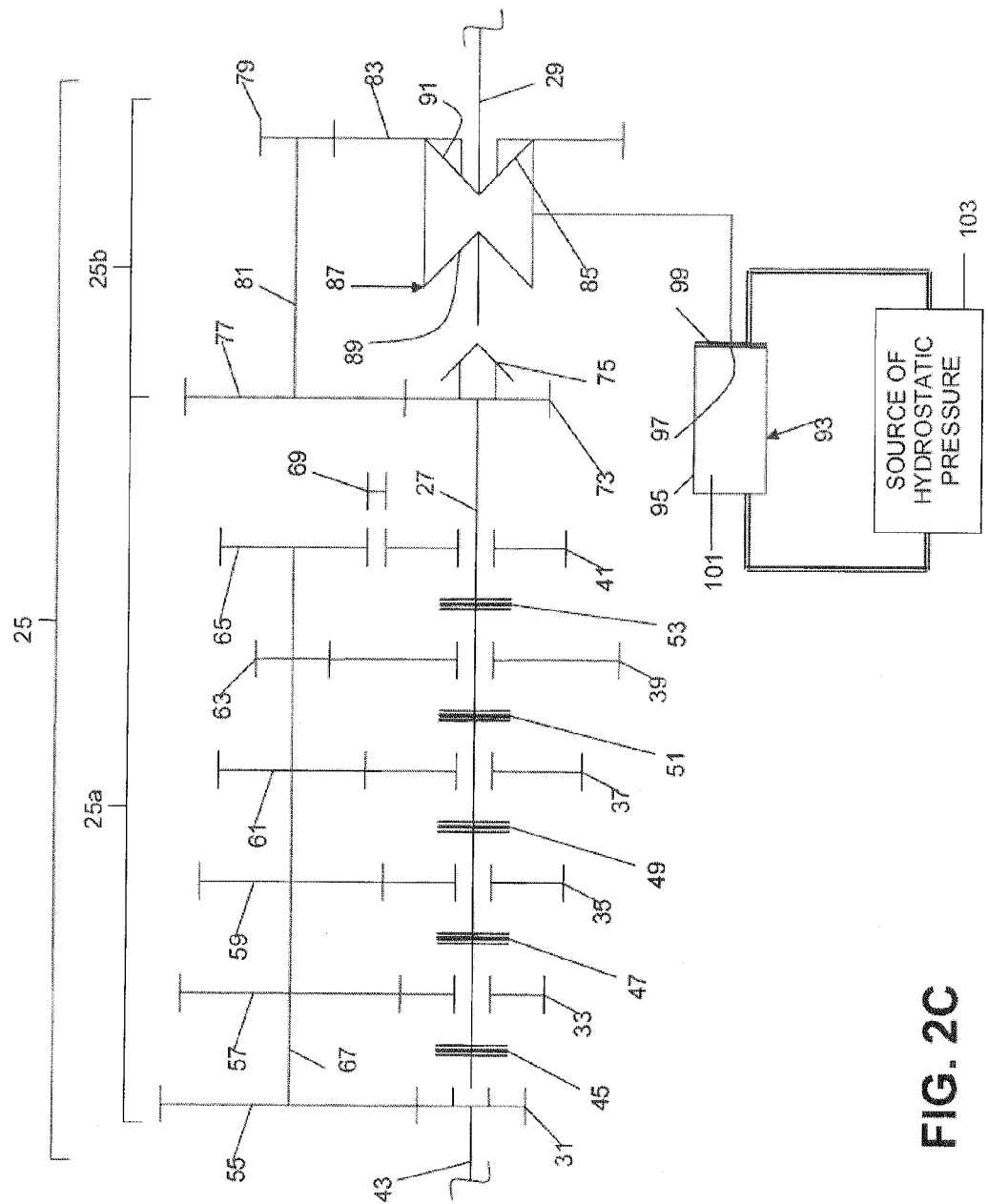

FIGS. 1A-1D show an arrangement 21 for inhibiting axial movement of a range clutch 87 in a transmission 25 of the general type shown in FIGS. 2A-2C. The illustrative transmission 25 comprises a main shaft 27 and an output shaft 29. The range clutch 87, shown in a neutral position in FIG. 2A, is movable on the output shaft 29 between a high range position (FIG. 2B) and a low range position (FIG. 2C) to modify a main shaft 27 rotational speed to at least one different output shaft 29 rotational speed. It will be appreciated that the transmission 25 can form part of a vehicle such as a heavy truck.

The transmission 25 comprises a main portion 25a and an auxiliary portion 25b. The main portion 25a comprises a plurality of selectable gears comprising a forward gear, which may comprise a plurality of forward gears 31, 33, 35, 37, and 39, and a reverse gear 41, which may comprise a plurality of reverse gears (only one reverse gear shown), for providing different speed ratios between an input shaft 43 and the main shaft 27. Clutches 45, 47, 49, 51, and 53 are splined to the main shaft 27 and axially movable by an operator to selectively couple one of the gears 31, 33, 35, 37, 39, and 41 to the main shaft 27 via gears 55, 57, 59, 61, 63, and 65 fixed on a countershaft 67 that is always driven by the input shaft via gears 31 and 55. An idler gear 69 is provided to mesh with the reverse gear 41 and the gear 65 when the transmission 25 is shifted into reverse. A main output gear 73 is axially and rotationally fixed at an end of the main shaft 27. A high range synchronizing clutch portion 75 is also connected to the end of the main shaft 27.

The auxiliary portion 25b of the transmission 25 comprises a large gear 77 and a small gear 79 mounted on an auxiliary countershaft 81. The large gear 77 meshes with the main output gear 73 and the small gear 79 meshes with an auxiliary output gear 83 that is axially fixed relative to the output shaft 29 and is not splined to the output shaft. A low range synchronizing clutch portion 85 is connected to the auxiliary output gear 83. A range clutch 87 is splined to the output shaft 29 and comprises a high range synchronizer cone 89 and a low range synchronizer cone 91 for engaging with the high range synchronizing clutch portion 75 (FIG. 2B) and the low range synchronizing clutch portion 85 (FIG. 2C), respectively, when the range clutch is moved left or right from the position shown in FIG. 2A. U.S. Pat. No. 6,571,927 discloses a range clutch with a synchronizing arrangement of a general type particularly adapted for use in connection with an aspect of the present invention and is incorporated by reference. When the range clutch 87 is in the position shown in FIG. 2B, the main shaft 27 is directly coupled to the output shaft 29 and the two shafts rotate at the same rotational speed. When the range clutch 87 is in the position shown in FIG. 2C, the main shaft 27 is coupled to the output shaft 29 via the gears 73, 77, 79, and 83 and the auxiliary countershaft 81 and the output shaft rotates at a different rotational speed than the main shaft.

The range clutch 87 is moved between the high range position (FIG. 2B) and the low range position (FIG. 2C) under power of a driver 93 such as a range cylinder 95 and a range piston 97 that define a high range chamber 99 and a low range chamber 101. A source 103 of hydrostatic pressure (FIG. 1) is selectively connected to the high range chamber and the low range chamber 101 to drive the piston 97 to the left to drive the range clutch 87 to the high range position (FIG. 2B) or to the right to drive the range clutch to the low range position (FIG. 2C). The source 103 of hydrostatic pressure may be a source of liquid, such as a reservoir of hydraulic fluid and a pump, or a source of a gas, such as a chassis air supply on a vehicle. The driver 93 need not, however, be in the form of a piston and cylinder driven by hydrostatic pressure. The driver may, for example, be electrically driven, such as via an electric motor or a solenoid arrangement.

The main shaft 27 rotates in a main shaft forward rotational direction MF (FIG. 2A) and in a main shaft reverse rotational direction MR (FIG. 2A) when coupled to the input shaft 43 and in the forward gear, i.e., one of gears 33-39, and in the reverse gear 41, respectively. The output shaft 29 rotates in an output shaft forward rotational direction OF (FIG. 2A) and in an output shaft reverse rotational direction OR (FIG. 2A) when coupled to the main shaft 27 rotating in the main shaft forward rotational direction MF and in the main shaft reverse rotational direction MR, respectively.

FIGS. 1A-1D show a driver 93 adapted to move the range clutch (not shown in FIGS. 1A-1D) axially on the output shaft between the high range position and the low range position. A rotation sensor 105 is provided and is adapted to, by itself or in combination with other structures, such as a reverse selector switch 127 and/or a reverse gear engagement sensor 127', sense reverse rotational direction MR and/or OR of at least one of the main shaft and the output shaft and to generate one or more signals comprising an inhibit range shift signal upon sensing reverse rotational direction. The rotation sensor 105 is any suitable sensor for detecting rotation of a shaft and is at least adapted to detect rotation when the main and/or output shafts are rotating in a reverse direction and provide a signal indicating that rotation is stopped or rotation is not stopped. A controller 107 of any suitable type, such as a conventional VECU, is provided and is adapted to inhibit operation of the driver 93 upon receipt of a shift inhibit signal comprising a rotation not stopped signal from the rotation sensor 105. Ordinarily, the shift inhibit signal will also include some form of indication that rotation of the main or output shafts is or possibly is in the reverse direction.

The illustrative driver 93 comprises a range cylinder 95 and a range piston 97 in the cylinder. The range piston 97 and range cylinder 95 define a high range chamber 99 and a low range chamber 101. The source 103 of hydrostatic pressure is provided for moving the range piston 97 in the range cylinder 95. The driver 93 moves the range clutch to the high range position when the source 103 of hydrostatic pressure is in flow communication with the high range chamber 99 and the driver moves the range clutch to the low range position when the source of hydrostatic pressure is in flow communication with the low range chamber 101.

The driver 93 can include a range shift valve 109 for controlling flow communication between the source 103 of hydrostatic pressure and the high range chamber 99 and the low range chamber 101. In addition, the arrangement 21 can comprise a switch 111 which can be arranged in any suitable location, such as a location easily accessible by an operator, such as on a shift control knob 113, to control positioning of the range shift valve 109. The switch 111 can be movable to a high range switch position (FIGS. 1B and 1C) and a low range switch position (FIGS. 1A and 1D) to shift the range clutch to the high range position and the low range position, respectively. The switch 111 can be part of, or can otherwise control, a valve for controlling flow in a line 115 to a port 117 on the range shift valve 109. As seen in FIGS. 1A and 1D, flow to the line 115 is permitted by the switch 111 when it is in the "Lo" position and, as seen in FIGS. 1B and 1C, flow to the line 115 is prevented by the switch when it is in the "Hi" position.

The range shift valve 109 comprises a range shift valve cylinder 119 and a range shift valve piston 121 defining a high range shift valve chamber 123 and a low range shift valve chamber 125. In the illustrative aspect of the invention shown in FIGS. 1A-1D, the switch 111 comprises a switch valve for opening and closing flow communication between the source 103 of hydrostatic pressure and the low range shift valve chamber 125 which moves the range shift valve piston 121 to the right to permit fluid communication between the source 103 of hydrostatic pressure and the low range chamber 101 of the driver 93 to shift the range clutch to the low range position. It will be appreciated that the switch could alternatively be arranged to permit flow communication between the source of hydrostatic pressure and the high range shift valve chamber 123 to permit fluid communication between the source of hydrostatic pressure and the high range chamber 99 of the driver to shift the range clutch to the high range position.

During operation of the transmission in neutral or one of the forward gears, when it is desired to shift the range clutch to the low range position, the switch 111 is moved to the "Lo" position, which permits flow communication between the source 103 of hydrostatic pressure and the low range shift valve chamber 125, which forces the range shift valve piston 121 to the right, such as in the position of the piston as seen in FIGS. 1A and 1B. When the range shift valve piston 121 is moved to the position at the right, the range shift valve 109 is configured to permit flow communication between the source 103 of hydrostatic pressure and the low range chamber 101, causing the range piston 97 to move to the right, such as in the position of the piston seen in FIGS. 1A and 1B.

During operation of the transmission in neutral or one of the forward gears, when it is desired to shift the range clutch to the high range position, the switch 111 is moved to the "Hi" position, which blocks flow communication between the source 103 of hydrostatic pressure and the low range shift valve chamber 125. In the illustrative embodiment, there is always flow communication between the source 103 of hydrostatic pressure and the high range shift valve chamber 123 and, as a result, the hydrostatic pressure forces the range shift valve piston 121 to the left, such as in the position of the piston as seen in FIGS. 1C and 1D. When the range shift valve piston 121 is moved to the position at the right, the range shift valve 109 is configured to permit flow communication between the source 103 of hydrostatic pressure and the high range chamber 99, causing the range piston 97 to move to the left, such as in the position of the piston seen in FIGS. 1C and 1D.

In the illustrative aspect of FIGS. 1A-1D, a reverse selector switch 127 and/or a reverse gear engagement sensor 127' functions together with the rotation sensor 105. The reverse selector switch 127 can be provided in any suitable location, ordinarily in an operator accessible location, such as on the shift knob 113. The reverse gear engagement sensor 127' can detect when the reverse gear is engaged. In FIGS. 1A-1D, the reverse selector switch 127 is in the "reverse" position. By shifting the reverse switch 127 to the reverse position, the transmission can be shifted into a reverse gear. If the reverse selector switch is not shifted to the reverse position, the transmission cannot be shifted into a reverse gear. The reverse selector switch 127 prevents the transmission from being shifted into a reverse gear unless the operator indicates an intent to do so by switching the reverse selector switch to the reverse position. Any suitable arrangement, such as an interlock arrangement, can be used to prevent unintentional shifting into a reverse gear.

In an aspect of the present invention, the reverse selector switch 127 can be configured to send a signal to the controller 107 when it is in the reverse position. Alternatively or in addition, a reverse gear engagement sensor 127' can be configured to send a signal to the controller when it senses engagement of the reverse gear. The controller 107 can be programmed to inhibit a range shift from low range to high range or from high range to low range (and also from neutral to either high or low range) when the signal from the reverse selector switch 127 indicating that it is in the reverse position and/or a reverse gear engaged signal from the reverse gear engagement sensor 127' is received and a rotation not stopped signal from the rotation sensor 105 is received. The signal from the reverse selector switch 127 may only indicate that rotation sensed by the rotation sensor 105 is potentially in the reverse direction, such as when the reverse selector switch is switched to the reverse position even though the transmission is actually in a forward gear. If the rotation sensor 105 is a sensor of a type that is adapted to detect when the main and/or output shafts are rotating in a reverse direction, then a signal from the rotation sensor alone can be used to inhibit range shifting, and the reverse selector switch 127 can function only to prevent unintentional shifting to or from reverse.

To inhibit range shifting, a range shift inhibitor valve 129 for opening and closing flow communication between the switch valve 111 and the low range shift valve chamber 125 can be provided. The range shift inhibitor valve 129 can be adapted to effectively disable the range shift valve 109. The controller 107 opens and closes the range shift inhibitor valve 129 in response to the inhibit range shift signal from what shall herein be referred to generally as a sensor indicating that one or both of the main shaft and the output shaft are rotating in a reverse direction and/or are potentially rotating in a reverse direction, it being appreciated that the sensor may comprise one or more sensors. One or both of the main shaft and the output shaft "potentially" rotating in a reverse direction means that a reverse selector switch 127 is switched to reverse and rotation, but not necessarily reverse rotation, is detected. The sensor may comprise arrangements such as a reverse rotation sensor or plural sensors such as a rotation sensor 105 together with the reverse selector switch 127 and/ or a reverse gear engagement sensor 127'.

FIG. 1A shows the arrangement 21 in a condition in which range shifting of the range clutch is not inhibited. In this condition, although the reverse selector switch 127 is in the reverse position (or the reverse gear engagement sensor 127' senses engagement of reverse gear), the rotation sensor 105 sends a signal indicating that there is no rotation of either the main shaft or the output shaft. Consequently, the controller 107 controls the range shift inhibitor valve 129 so as to keep the valve open in the illustrated embodiment (it will be appreciated that, in other embodiments, the controller might be arranged to control the shift inhibitor valve to keep it closed under the described circumstances). Because the range switch 111 is in the "Lo" position, the range switch permits flow communication between the source 103 of hydrostatic pressure and the low range shift valve chamber 125 of the range shift valve 109 which moves the range shift valve piston 121 to the right to a position that permits flow communication between the source of hydrostatic pressure and the low range chamber 101 so that the range piston 97 moves to a low range position and moves the range clutch to its low range position. If the range switch 111 is moved to the "Hi" position, flow communication between the source 103 of hydrostatic pressure and the low range shift valve chamber 125 is stopped and the range shift valve piston 121 is moved to the left to a position that permits flow communication between the source of hydrostatic pressure and the high range chamber 99 to that the range piston 97 moves to the high range position and moves the range clutch to the high range position as seen in FIG. 1C. Hydrostatic fluid in the low range shift valve chamber 125 can be allowed to be removed from the low range shift valve chamber in any appropriate manner such as, for hydrostatic fluid such as air, being vented to the atmosphere.

If, however, the reverse selector switch 127 is in the reverse position (or the reverse gear engagement sensor 127' senses engagement of reverse gear) and the rotation sensor 105 senses rotation, the controller 107 controls the shift inhibitor valve 129 to close. When the shift inhibitor valve 129 closes, shifting the range switch 111 from "Lo" to "Hi" as seen in FIG. 1B has no effect in moving the range shift valve piston 121 because the hydrostatic fluid in the low range shift valve chamber 125 is prevented from escaping and insufficient force is developed by hydrostatic fluid introduced into the high range shift valve chamber 123 to overcome the force of the hydrostatic fluid in the low range shift valve chamber. When the shift inhibitor valve 129 closes, shifting the range switch 111 from "Hi" to "Lo" as seen in FIG. 1D has no effect in moving the range shift valve piston 121 because the shift inhibitor valve 129 blocks hydrostatic fluid in the line 115 from the low range shift valve chamber 125 and the hydrostatic fluid introduced into the high range shift valve chamber 123 keeps the range shift valve piston 121 in the position in which the source 103 of hydrostatic pressure communicates with the high range chamber 99.

The controller 107 logic can be such that, once the range shift is inhibited, the controller will not allow a range shift until it receives both a rotation stopped signal from the rotation sensor 105 and a reverse gear not engaged and/or selected signal from the reverse gear engagement sensor 127' and/or the reverse selector switch 127.

According to an aspect of the present invention, a convenient method of retrofitting a transmission to inhibit axial movement of a range clutch in the transmission is provided. A conventional transmission 25 (FIGS. 2A-2C) will typically include a controller 107, a driver 93, a range shift valve 109, a range switch 111 and a source 103 of hydrostatic pressure arranged substantially as in the arrangement 21 shown in FIGS. 1A-1D. The transmission may or may not include a sensor arrangement such as a rotation sensor 105 together with a reverse selector switch 127 and/or a reverse gear engagement sensor 127' adapted to sense at least one of reverse rotational direction and potential reverse rotational direction of at least one of the main shaft 27 and the output shaft 29 and to send a signal to a controller when at least one of reverse rotational direction and potential reverse rotational direction of the at least one of the main shaft and the output shaft is sensed. If such a sensor arrangement is not provided, it can be provided as part of the retrofitting method according to an aspect of the present invention.

The retrofitting method according to an aspect of the present invention can also include providing a range shift inhibitor valve 129 for opening and closing flow communication between the source 103 of hydrostatic pressure and one of the high range shift valve chamber 123 and the low range shift valve chamber 125. In the embodiment shown in FIGS. 1A-1D, the range shift inhibitor valve 129 would be provided between the source 103 of hydrostatic pressure and the low range shift valve chamber 125. The controller 107 can be programmed with code for outputting a signal from the controller in response to a signal from the sensor arrangement indicating at least one of reverse rotational direction and potential reverse rotational direction, and the controller signal can control opening and closing of the range shift inhibitor valve to inhibit or permit range shifting.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An arrangement for inhibiting axial movement of a range clutch in a transmission, the transmission comprising a main shaft and an output shaft, the range clutch being movable on the output shaft between a high range position and a low range position to modify a main shaft rotational speed to at least one different output shaft rotational speed, and a plurality of selectable gears comprising a forward gear and a reverse gear for providing different speed ratios between an input shaft and the main shaft, the main shaft rotating in a main shaft forward rotational direction and in a main shaft reverse rotational direction when coupled to the input shaft and in the forward gear and in the reverse gear, respectively, the output shaft rotating in an output shaft forward rotational direction and in an output shaft reverse rotational direction when coupled to the main shaft rotating in the main shaft forward rotational direction and in the main shaft reverse rotational direction, respectively, the arrangement comprising:

a driver adapted to move the range clutch axially on the output shaft between the high range position and the low range position;

a sensor arrangement adapted to sense at least one of reverse rotational direction and potential reverse rotational direction of at least one of the main shaft and the output shaft and to generate an inhibit range shift signal upon sensing at least one of reverse rotational direction and potential reverse rotational direction; and a controller adapted to inhibit operation of the driver upon receipt of the inhibit range shift signal from the sensor arrangement.

2. The arrangement as set forth in claim 1, wherein the driver comprises a range cylinder and a range piston in the cylinder, the range piston and range cylinder defining a high range chamber and a low range chamber, and a source of hydrostatic pressure for moving the range piston in the range cylinder, the driver moving the range clutch to the high range position when the source of hydrostatic pressure is in flow communication with the high range chamber and the driver moving the range clutch to the low range position when the source of hydrostatic pressure is in flow communication with the low range chamber.

3. The arrangement as set forth in claim 2, wherein the driver comprises a range shift valve for controlling flow communication between the source of hydrostatic pressure and the high range chamber and the low range chamber.

4. The arrangement as set forth in claim 3, the arrangement comprising a switch arranged to control positioning of the range shift valve, the switch being movable to a high range switch position and a low range switch position to shift the range clutch to the high range position and the low range position, respectively.

5. The arrangement as set forth in claim 4, wherein the range shift valve comprises a range shift valve cylinder and a range shift valve piston defining a high range shift valve chamber and a low range shift valve chamber, and the switch comprises a switch valve for opening and closing flow communication to one of the high range shift valve chamber and the low range shift valve chamber to shift the range clutch to one of the high range position and the low range position.

6. The arrangement as set forth in claim 5, comprising a range shift inhibitor valve for opening and closing flow communication between the switch valve and the one of the high range shift valve chamber and the low range shift valve chamber.

7. The arrangement as set forth in claim 6, wherein the controller opens and closes the range shift inhibitor valve in response to the inhibit range shift signal from the sensor arrangement.

8. The arrangement as set forth in claim 7, wherein the sensor arrangement comprises an output shaft sensor arranged to send a not stopped output shaft signal and a stopped output shaft signal to the controller when the output shaft is not stopped and stopped, respectively, the controller being adapted to inhibit operation of the driver upon receipt of the not stopped output shaft signal.

9. The arrangement as set forth in claim 8, wherein the sensor arrangement comprises a reverse selector switch movable between a forward selected position and a reverse selected position and arranged to send a reverse selected signal to the controller when the reverse selector switch is in the reverse selected position, the controller being adapted to inhibit operation of the driver upon receipt of the reverse selected signal.

10. The arrangement as set forth in claim 9, wherein the inhibit range shift signal to the controller comprises the not stopped output shaft signal and the reverse selected signal.

11. The arrangement as set forth in claim 1, wherein the sensor arrangement comprises an output shaft sensor arranged to send a not stopped output shaft signal and a stopped output shaft signal to the controller when the output shaft is not stopped and stopped, respectively, the controller being adapted to inhibit operation of the driver upon receipt of the not stopped output shaft signal.

12. The arrangement as set forth in claim 11, wherein the sensor arrangement comprises a reverse selector switch movable between a forward selected position and a reverse selected position and arranged to send a reverse selected signal to the controller when the reverse selector switch is in the reverse selected position, the controller being adapted to inhibit operation of the driver upon receipt of the reverse selected signal.

13. The arrangement as set forth in claim 12, wherein the inhibit range shift signal to the controller comprises the not stopped output shaft signal and the reverse selected signal.

14. The arrangement as set forth in claim 11, wherein the sensor arrangement comprises a reverse gear engagement sensor arranged to send a reverse gear engaged signal to the controller when engagement of the reverse gear is sensed, and the inhibit range shift signal to the controller comprises the not stopped output shaft signal and the reverse gear engaged signal.

15. A transmission comprising the arrangement of claim 1.

16. A vehicle comprising a transmission comprising the arrangement of claim 1.

17. A method for inhibiting axial movement of a range clutch in a transmission, the transmission comprising a main shaft and an output shaft, the range clutch being movable on the output shaft between a high range position and a low range position to modify a main shaft rotational speed to at least one different output shaft rotational speed, and a plurality of selectable gears comprising a forward gear and a reverse gear for providing different speed ratios between an input shaft and the main shaft, the main shaft rotating in a main shaft forward rotational direction and in a main shaft reverse rotational direction when coupled to the input shaft and in the forward gear and in the reverse gear, respectively, the output shaft rotating in an output shaft forward rotational direction and in an output shaft reverse rotational direction when coupled to the main shaft rotating in the main shaft forward rotational direction and in the main shaft reverse rotational direction, respectively, the method comprising:
sensing at least one of reverse rotational direction and potential reverse rotational direction of at least one of the main shaft and the output shaft and inhibiting movement of the range clutch axially on the output shaft between the high range position and the low range position.

18. The method as set forth in claim 17, wherein the range clutch is adapted to be moved to the high range position and the low range position by positioning a range shift valve in a high range shift valve position and a low range shift valve position, respectively, so that a source of hydrostatic pressure is adapted to communicate with a high range chamber and a low range chamber, respectively, of a range cylinder, the high range chamber and the low range chamber being defined by a piston movable in the range cylinder, the piston being connected to the range clutch, the method comprising inhibiting movement of the range clutch by disabling the range shift valve.

19. The method as set forth in claim 18, wherein the range shift valve is disabled by one of opening and closing a range shift inhibitor valve for opening and closing flow communication between the source of hydrostatic pressure and the one of the high range shift valve chamber and the low range shift valve chamber.

20. A method of retrofitting a transmission to inhibit axial movement of a range clutch in the transmission, the transmission comprising a main shaft and an output shaft, the range clutch being movable on the output shaft between a high range position and a low range position to modify a main shaft rotational speed to at least one different output shaft rotational speed, and a plurality of selectable gears comprising a forward gear and a reverse gear for providing different speed ratios between an input shaft and the main shaft, the main shaft rotating in a main shaft forward rotational direction and in a main shaft reverse rotational direction when coupled to the input shaft and in the forward gear and in the reverse gear, respectively, the output shaft rotating in an output shaft forward rotational direction and in an output shaft reverse rotational direction when coupled to the main shaft rotating in the main shaft forward rotational direction and in the main shaft reverse rotational direction, respectively, wherein the range clutch is adapted to be moved to the high range position and the low range position by positioning a range shift valve in a high range shift valve position and a low range shift valve position, respectively, so that a source of hydrostatic pressure is adapted to communicate with a high range chamber and a low range chamber, respectively, of a range cylinder, the high range chamber and the low range chamber being defined by a piston movable in the range cylinder, the piston being connected to the range clutch, the method comprising:
providing a sensor arrangement to sense at least one of reverse rotational direction and potential reverse rotational direction of at least one of the main shaft and the output shaft and send a signal to a controller when at least one of reverse rotational direction and potential reverse rotational direction of the at least one of the main shaft and the output shaft is sensed;
providing an openable and closable range shift inhibitor valve for opening and closing flow communication between the source of hydrostatic pressure and the one of the high range shift valve chamber and the low range shift valve chamber; and
programming the controller to output a signal in response to the sensor arrangement signal, the controller signal controlling opening and closing of the range shift inhibitor valve.

* * * * *